United States Patent [19]

Girodin

[11] 4,139,331
[45] Feb. 13, 1979

[54] ROTOR FOR A HELICOPTER

[76] Inventor: Mario Girodin, La Fontaine Pleureuse, Bazemont, France, 78

[21] Appl. No.: 749,103

[22] Filed: Dec. 9, 1976

[51] Int. Cl.² .................................................. B64C 27/72
[52] U.S. Cl. ...................................... 416/114; 416/140; 416/141
[58] Field of Search ................ 416/140 A, 138 P, 141, 416/150, 149, 153, 112–114, 133

[56] References Cited

U.S. PATENT DOCUMENTS

| 2,233,747 | 3/1941 | Riedl | 416/148 X |
|---|---|---|---|
| 2,519,762 | 8/1950 | Hoffmann et al. | 416/140 A X |
| 2,557,338 | 6/1951 | Caldwell | 416/140 A X |
| 2,677,429 | 5/1954 | Laufer | 416/140 A X |
| 2,689,616 | 9/1954 | Nagler | 416/114 |
| 3,303,888 | 2/1967 | Wolf | 416/50 X |
| 3,310,119 | 3/1967 | Watson | 416/140 A X |

FOREIGN PATENT DOCUMENTS

1138613  6/1957  France ................................. 416/141

Primary Examiner—Everette A. Powell, Jr.

Attorney, Agent, or Firm—Holman & Stern

[57] ABSTRACT

A helicopter rotor assembly comprises a rotor including a rotor boss and a rotor cup in, and coaxial with, said boss, a plurality of rotor blades each having an integral rigid spindle connecting the blade to the rotor with the spindle axes intersecting at the axis of rotation of the rotor and with the blades being inclined upwardly from the rotor. Articulated joints connect the spindles with the boss and further articulated joints connect the spindles with the cup. The blades are rotatable about the spindle axes and control means is provided for lifting and lowering the rotor boss relative to the cup to vary the inclination of the blades. According to a preferred feature, the axis of each spindle forms an angle with the line of focus of each respective blade which line of focus is located behind the spindle axis relative to the direction of rotation of the blade and the apex of this spindle blade angle is spaced from the rotor boss rotation axis by an amount such that flexural couples in the plane of the blade produced during rotation of the rotor are cancelled out by centrifugal force.

7 Claims, 2 Drawing Figures

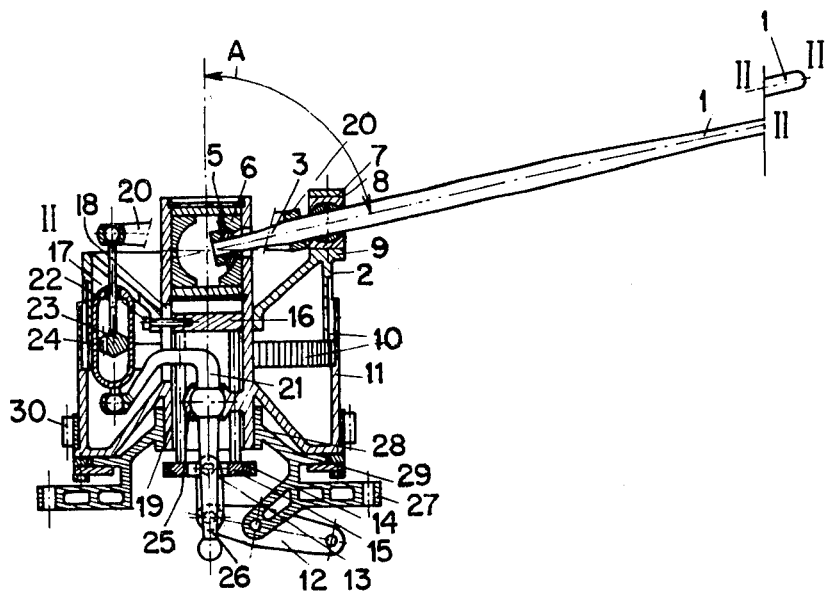
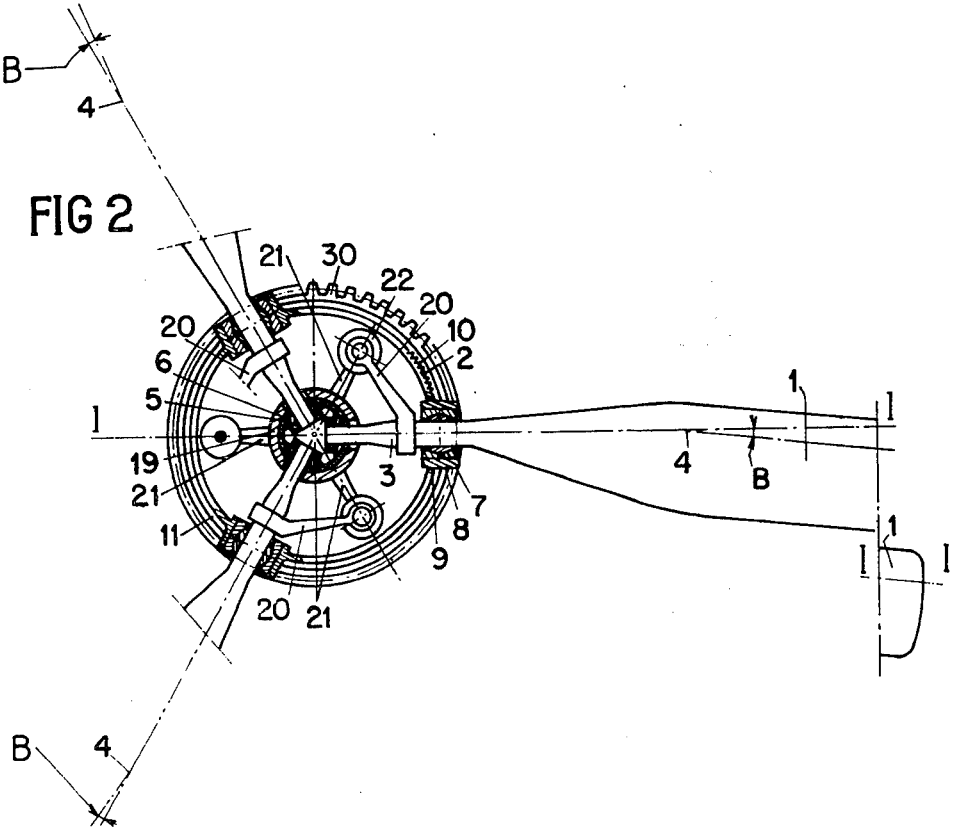

ROTOR FOR A HELICOPTER

This invention relates to helicopter rotors.

In existing helicopters, the rotor blades are attached to the rotor boss by three orthogonal joints or equivalent elastic members when the boss is integral with the rotation axis or by a radial joint when the boss is articulated by two perpendicular axes on the rotation axis.

In addition to steering, piloting with the rotor has two functions:

1. Changing the pitch of the blades overall by directly controlling the incidence thereof to vary the lift;
2. Cyclically changing the pitch of the blades by direct control to incline the rotor plane so as to vary the direction of the lifting force.

This method of piloting by varying the intensity and direction of the lifting force has the disadvantages of causing instability, being slow to respond, and resulting in dangerous zones, requiring an expensive heavy rotor and delicate controls. It is an object of the present invention to provide a helicopter rotor which can overcome or at least reduce such disadvantages.

The present invention provides a rotor for a helicopter including a plurality of rotor blades and a rotor boss, each blade having a spindle extension forming a joint with the rotor boss, each spindle being substantially disposed in a plane containing the axis of rotation of the rotor boss, each spindle being rotatable about its longitudinal axis, and control means arranged to vary the angle said spindles make with said rotor boss rotation axis, said angle being less than $\pi/2$.

In a preferred embodiment, each rotor blade, without any other coupling, is attached to the boss by means of a spindle freely rotatable about its own axis, the spindle being located in a plane radial to said boss, and forming an angle in the direction of rotation with the line of foci of said blade, the apex of which is at a distance from the rotation axis such that the torque is, on average, compensated by the centrifugal force exerted on the blade, and the angle of the spindle axis with the rotor boss rotation axis, which is identical for all the blades, is less than $\pi/2$ and can be regulated by the pilot.

Thus, at any given time, the incidence of each blade is the result of the equilibrium of the component of the centrifugal force on the cone of rotation and the lift of the blade.

The centrifugal force being constant for a given number of revolutions, the lift is regulated by adjusting the angle between the blade spindles and the boss rotation axis.

Therefore, the rotor according to the invention makes it possible, without controlling the blades, to obtain a lifting force coaxial with the rotor drive shaft with the cone produced by the blades of a substantially fixed direction.

Piloting in incidence or roll is effected by aerodynamically creating longitudinal or tranverse couples.

According to the invention, the simplest method is to use the rotor itself to provide these piloting couples.

For this purpose, a cyclic blade control is provided, characterised in that it does not impose a position or an angle on the spindle of the blade, a couple which can be varied with the azimuth and is independent of the position of the incident blade.

According to the invention, one type of control for creating aerodynamic couples is characterised in that the blades are fitted with a lever attached to a cyclic plate or spider arrangement analogous to those on conventional helicopters but wherein the connecting rods are replaced by hydraulic jacks the pistons of which have an aperture adapted to ensure, by an escape fluid flow, a loss of load proportional to the velocity.

Thus, without any piloting activity, the blades are free to orientate themselves to ensure that they have substantially constant lift, whilst the jacks act as vibration absorbers.

The couple exerted on the rotor as a whole is equal to the couple introduced on the blades divided by the tangent of the angle of displacement of the blades behind the axis of the blade spindles.

Since the couple exerted on the blades is itself very much greater than the couple exerted on the controls by the pilot — by the normal effect of the gearing down of the control sequence — it is possible to produce substantial control couples instantaneously without any intermediate inertia effect.

A preferred embodiment will now be described with reference to the accompanying drawings wherein:

FIG. 1 is a section through the rotation axis, on the line I—I in FIG. 2, of the boss of a helicopter rotor with three blades according to the invention; and FIG. 2 is a section on the line II—II in FIG. 1.

In FIGS. 1 and 2, each rotor blade 1 is attached to the rotor boss 2 by a spindle extension 3 of the blade. According to the invention, each spindle 3 is in a meridian plane containing the axis of rotation of the rotor boss and externally forms an angle A with the rotor boss axis of less than $\pi/2$. The axis of each spindle makes an angle B with the axis of each blade, the blade axis being located behind the spindle axis relative to the direction of rotor rotation. The apex 4 of angle B in the direction of rotation relative to the blade and its distance from the rotation axis is such that the bending moments in the plane of the blade are, on average, compensated by the centrifugal force.

The spindle 3 is mechanically free to rotate and abuts with a spherical end zone portion 5 on a spherical cup 6, disposed on the interior of boss 2 with a common center for all the spindles.

Each blade is rotationally driven via a bearing 7 with an outer spherical bearing surface 8 carried by the top 9 of the boss.

The top 9 of the boss is rotationally driven by gear teeth 10 in sliding engagement with a base 11 of the boss.

The pilot regulates the angle A defining the lift for a given number of revolutions, by axially displacing top 9 relative to base 11 by means of a control acting on a lever 12 which, via symmetrical rods 13 and a ring 14 suitably held in rotation and a double thrust 15, acts on a central driving body 16 connected to the top 9 of the boss by three radial pins 17 moving in longitudinal apertures 18 in a central cylinder 19 which is integral with the base 11 of the boss.

Each spindle 3 has a lever 20 the end of which is connected to the corresponding end of a spider arrangement 21 by an hydraulic jack 22 according to the invention, the piston 23 of which contains an aperture 24 providing communication between the two chambers of the jack cylinder.

The spider arrangement 21 is centered in the central cylinder 19 by a ball-and-socket cage 25 attached to said cylinder 19 by three arms and thus allowing the passage of the connecting rods of the driving body 16 controlling the angle A. A lever 26 of the spider arrangement 21 receives depth and roll commands at right angles to it.

The base 11 of the boss is centered on a boss support 27 by a central bearing 28 and a double action peripheral thrust 29.

The boss 2 is rotationally driven by peripheral gearing 30 appropriately coupled to the helicopter engine or to the turbine.

Each blade portion dr with the radius $\zeta$ is subjected to radial centrifugal force: $d F_c = \Omega^2 \delta \zeta \, dr$, $\delta$ being the linear mass of the blade, expressed as a couple, increasing the incidence on the axis of the spindle having the elementary value:

$$d M_c = d F_c \, tg \, A \, r \, tg \, B = \Omega^2 \zeta^2 \, tg \, A \, tg \, B \, \delta \, dr$$

On the other hand, if i is the actual aerodynamic incidence of the portion of blade being considered, the elementary aerodynamic couple reducing the incidence by the axis of spindle is:

$$d M_i = 5.731 \, (P/2) \, \Omega^2 \zeta^2 \, r \, tg \, B \, t \, dr$$

t being the depth of the blade. In equilibrium, we have:

$$\delta tg \, A = 5.731 \, r \, t \, (P/2)$$

If $\delta$ is constant we may therefore have point by point equilibrium if irt is constant. This borderline case can only exist when hovering.

In different cases of flight, the angles A and i vary and tend towards point-by-point equilibrium at any given moment and overall equilibrium is established automatically. This eliminates any cyclic pitch control and further makes such control detrimental.

To control incidence or rolling, the lever 26 is made to act on the spider arrangement 21, which has the effect of creating a cyclic out-flow in the calibrated hold 24 of each piston 23, and this in turn has the effect of producing a difference in cyclic pressure and consequently a cyclic couple on each blade base opposing equilibrium and thus creating an aerodynamic couple the vector of which is normal to the rotation axis and the value of which is equal to that of the couple exerted on the spindle divided by tg B.

The lengths of the levers 20 and jacks 22 are such that the blades 1 may be vertical on stopping under the effect of their own weight, i.e. with the leading edge at the top and the trailing edge at the bottom.

What I claim is:

1. A rotor for a helicopter including a plurality of rotor blades, a rotor boss and a rotor hub disposed within said boss, said hub and said boss having a common axis of rotation, each blade having an integral spindle extension, an articulated joint between each spindle extension and the rotor boss, a further articulated joint between each spindle extension and said hub, each spindle extension having a longitudinal axis, the longitudinal axes of said spindle extensions intersecting at the common axis of rotation of the rotor boss and hub, each spindle extension being rotatable about its longitudinal axis, and control means arranged to vary the inclination of said blades by adjusting the angle said spindle extensions make with said common axis of rotation, said angle always being less than $\pi/2$, said control means comprising pilot-operated linkage means connected to said boss for lifting and lowering said boss relative to said hub.

2. A rotor as claimed in claim 1 wherein the axis of each spindle extension forms an angle with the line of focus of its respective blade said line of focus being behind the spindle extension axis relative to the direction of rotation of the blade.

3. A rotor as claimed in claim 1 including means for applying cyclic couples to each said spindle about the spindle axis, said couples being variable in value and phase.

4. A rotor as claimed in claim 3 wherein said couple applying means includes for each spindle a sliding connecting rod of variable length with internal resistance acting on a lever coupled to each spindle.

5. A rotor as claimed in claim 4 wherein each sliding connecting-rod of variable length comprises an hydraulic jack having an internal fluid escape such that the movement of the piston of the jack relative to the cylinder of the jack creates a desired loss of load and hence a desired pressure.

6. A rotor as claimed in claim 4 wherein the sliding connecting-rods are connected, at their ends remote from the spindles, to means controllable by a helicopter pilot.

7. A rotor as claimed in claim 3 wherein the weight of each blade is such that in a stationary condition of the rotor the blade is disposed in a vertical plane.

* * * * *